3,448,131
PROCESS FOR PREPARING TRIHYDRO-
CARBYLTIN ACETOACETATES
John K. Chan and Erich Marcus, Charleston, W. Va., assignors to Union Carbide Corporation, a corporation of New York
No Drawing. Filed Mar. 30, 1966, Ser. No. 538,586
Int. Cl. C07f 7/22
U.S. Cl. 260—429.7          6 Claims

ABSTRACT OF THE DISCLOSURE

Acetoacetic esters of organotin compounds are prepared by the reaction of a trihydrocarbyltin hydroxide with diketene. These esters have the following formula:

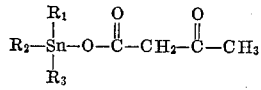

wherein each of the $R_1$, $R_2$ and $R_3$ groups is a hydrocarbon radical containing from 1 to about 20 carbon atoms, preferably from 1 to 10 carbon atoms.

---

The present invention relates to novel organotin compounds and to a process for their preparation. More particularly, the invention relates to the preparation of novel acetoacetic esters of organotin compounds by the reaction of a trihydrocarbyltin hydroxide with diketene.

It is well-known that the reaction of a trihydrocarbyltin halide with sodium acetate leads to the corresponding trihydrocarbyltin acetate. It has been reported, however, that the reaction of trihydrocarbyltin halides with acetoacetic esters in an alcoholic solution of sodium hydroxide produces compounds of the general formula:

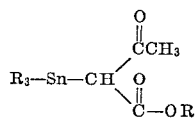

wherein each R is a hydrocarbon radical. Trihydrocarbyltin acylates can also be prepared by reacting a trihydrocarbyltin hydroxide with a carboxylic acid. The conditions required for this reaction would be expected to decompose the relatively unstable acetoacetic acid which would be necessary to prepare the heretofore unknown trihydrocarbyltin acetoacetates by an analogous method.

It is also known that diketene will react with alcohols to produce acetoacetic esters and that diketene will react with a molar excess of water to produce acetone via the decomposition of the intermediate acetoacetic acid. We have found that the novel class of trihydrocarbyltin acetoacetates can be readily prepared by the reaction of trihydrocarbyltin hydroxide compounds with diketene.

The novel compounds of this invention can be conveniently represented by the formula:

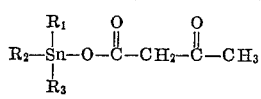

wherein each of the $R_1$, $R_2$ and $R_3$ groups is a hydrocarbon radical containing from 1 to about 20 carbon atoms, preferably from 1 to 10 carbon atoms. For example, $R_1$, $R_2$ and $R_3$ can be alkyl, cycloalkyl, aryl, alkaryl, or aralkyl radicals such as methyl, ethyl, propyl, 2-ethylhexyl, dodecyl, eicosyl, cyclopentyl, cyclohexyl, phenyl, tolyl, xylyl, p-butylphenyl, benzyl, naphthyl, anthryl, biphenyl, and the like. If desired, the hydrocarbon radicals can carry non-hydrocarbon substituents such as alkoxy, aryloxy, cyano, halo and like substituents that contain no hydrogen atoms which are reactive with diketene. Whether substituted or unsubstituted, the radicals $R_1$, $R_2$ and $R_3$ need not be the same although it is preferred that they be identical because of the greater availability of the corresponding starting materials. The particularly preferred compounds are the trimethyl and triethyltin acetoacetates, and the triaryltin acetoacetates having from 22 to about 30 carbon atoms per molecule.

Illustrative of the novel compounds of this invention are trimethyltin acetoacetate, triethyltin acetoacetate, triisopropytin acetoacetate, tri-n-hexyltin acetoacetate, tri-(2-ethylhexyl)tin acetoacetate, tricyclohexyltin acetoacetate, tri(4-ethylcyclohexyl)tin acetoacetate, tribenzyltin acetoacetate, triphenyltin acetoacetate, trixylyltin acetoacetate, tri(4-chlorophenyl)tin acetoacetate, tri(2-ethoxyphenyl)tin acetoacetate, dimethylethyltin acetoacetate, dimethylphenyltin acetoacetate, diphenyl(biphenyl)tin acetoacetate, and the like.

The novel compounds of this invention can be readily prepared by reacting diketene with a trihydrocarbyltin hydroxide having the formula:

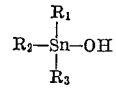

wherein $R_1$, $R_2$ and $R_3$ are as defined above. Illustrative of the trihydrocarbyltin hydroxides are trimethyltin hydroxide, triethyltin hydroxide, triisopropyltin hydroxide, tri-n-hexyltin hydroxide, tri(2-ethylhexyl)tin hydroxide, tricyclohexyltin hydroxide, tri(4-ethylcyclohexyl)tin hydroxide, tribenzyltin hydroxide, triphenyltin hydroxide, trixylyltin hydroxide, tri(4-chlorophenyl)tin hydroxide, tri(2-ethoxyphenyl)tin hydroxide, dimethylethyltin hydroxide, dimethylphenyltin hydroxide, diphenyl(biphenyl)tin hydroxide, and the like.

The trihydrocarbyltin hydroxides can be readily prepared in accordance with known methods. For example, they can be prepared by chlorination of a tetrahydrocarbyltin compound followed by hydrolysis of the resulting trihydrocarbyltin chloride. Other methods are described in Luijten and Van der Kirk, "Investigations in the Field of Organotin Chemistry," Tin Research Institute, Greenford, Middlesex, England (1955).

The molar ratio of the diketene to trihydrocarbyltin hydroxide employed is not narrowly critical. Although the stoichometry of the reaction is such that the reactants are consumed on a mole for mole basis, it is preferable to use a molar excess of diketene to assure maximum consumption of the more expensive trihydrocarbyltin hydroxide compound. Molar ratios of diketene to trihydrocarbyltin hydroxide of from 1.0 to 2.0 provide excellent product yields. Of course, higher molar ratios can be used if desired, but little advantage will thereby be obtained.

The reaction is conveniently conducted in any substantially anhydrous, liquid diluent which is inert with respect to diketene under the chosen conditions for the reaction. Suitable diluents include hydrocarbon solvents such as heptane, mineral oil, cyclohexane, benzene, toluene, and the like; ethers such as diethyl ether and diisopropyl ether, and the like; ketones such as acetone, methyl ethyl ketone, diethylketone and the like; and esters such as ethyl acetate, butyl acetate, ethylene glycol monobutylether acetate, and the like. Benzene and diethyl ether are the preferred diluents.

The concentration of the reactants in the diluent can vary widely. It is preferred that the concentration be such that the reactants will be completely dissolved or easily suspended in the diluent. In general, amounts of from 1000 to 2500 milliliters of diluent per mole of the trihydrocarbyltin hydroxide will be suitable.

Although not essential, it is expedient to carry out the reaction in the presence of a catalytically effective concentration of a tertiary amine. It is preferred that the tertiary amine employed as the catalyst be free of hydrogen atoms which are reactive with diketene and contain less than 18 carbon atoms per tertiary nitrogen atom. Illustrative of the tertiary amines which are useful as catalysts in the process of this invention are trimethylamine, dimethylethylamine, triethylamine, tri-n-butylamine, tri(2-ethylhexyl)amine, N,N,N′,N′-tetramethylethylene-diamine, N-methylpyrrolidine, N-ethylpiperidine, N,N′-di-n-propylpiperazine, N-sec-butylmorpholine, N-methylhexamethylenimine, N,N-dimethylaniline, pyridine, 2-picoline, 3,5-lutidine, 2,4,5-collidine, quinoline, quinaldine, 4-ethylquinoline, and the like.

The preferred tertiary amine catalysts are the azabicyclooctane compounds such as 1,4-diazabicyclo[2.2.2]octane, 1-azabicyclo[2.2.2]octane, and their alkyl and dialkyl derivatives wherein each alkyl group contains from 1 to about 8 carbon atoms; for example, 2,6-dimethyl-1,4-diazabicyclo[2.2.2]octane, 3,5-diethyl-1-azabicyclo[2.2.2]octane, 2-n-butyl-1,4-diazabicyclo-[2.2.2]octane, 3-isopropyl-1-azabicyclo[2.2.2]octane, 2-(2-ethylhexyl)-1,4-diazabicyclo[2.2.2]octane, 3,5-dioctyl-1-azabicyclo[2.2.2]octane, and the like. The particularly preferred catalysts are 1,4-diazabicyclo[2.2.2]octane and 1-azabicyclo[2.2.2]octane.

The tertiary amine compounds are used in catalytically effective concentrations. The concentration to be used in any given case will depend to some extent upon the activity of the particular tertiary amine used, the selected reaction temperature and the desired rate of reaction. In general, concentrations ranging from about 0.01 to about 5.0 percent by weight or higher, based on the weight of the reactants, provide satisfactory results. While still higher concentrations will lead to somewhat higher reaction rates, they are not advisable in view of economic considerations. Concentrations of from 0.1 to about 1.0 percent are preferred.

The temperature at which the reaction is carried out is not narrowly critical. Generally, the temperature can range from about −20° C. to about 150° C. although care must be taken to insure that the decomposition temperature of the chosen reactants is not exceeded. The preferred reaction temperature range is from about 0° C. to 80° C. with temperatures from about 25° C. to 40° C. being particularly desirable. Atmospheric pressures are suitable for conducting the reaction although somewhat higher or lower pressures can be used without any appreciable effect upon the reaction.

The time required to complete the reaction varies depending primarily upon the particular reactants employed and the temperature of operation. When operating at a temperature of from 25° C. to 40° C. a reaction time of from 3 to 5 hours is ordinarily sufficient to complete the reaction. Of course, it is not essential that the reaction be allowed to go to completion and appreciable amounts of product can be recovered in substantially less time. Economic considerations are largely determinative of the optimum reaction time.

In a preferred embodiment of the present invention a trihydrocarbyltin hydroxide and a tertiary amine catalyst are added to a suitable inert organic liquid diluent such as benzene or diethyl ether and, while being continuously stirred, diketene is slowly added thereto at a temperature of from 25° C. to 40° C. After the addition of diketene has been completed, the reaction mixture is stirred at room temperature until a substantially clear solution signals the completion of the reaction.

The trihydrocarbyltin acetoacetate product can be recovered by conventional means well known to those skilled in the art. For example, any insoluble matter which may form during the course of the reaction is first filtered off and the solvent is then removed by distillation under reduced pressure. When the reaction product is solid, it can be further purified by recrystallization from a suitable solvent. When the product is a liquid, it can be readily recovered by standard techniques such as by extraction.

The novel compounds of this invention are highly useful as heat stabilizers for poly(vinyl chloride) resins. In certain respects the trihydrocarbyltin acetoacetates, particularly the triaryltin acetoacetates, are surprisingly superior to dibutyltin dilaurate which is used commercially as a heat stabilizer for poly(vinyl chloride) resins. In addition to their utility as heat stabilizers, the trihydrocarbyltin acetoacetates exhibit excellent fungitoxicity which renders them of particular interest in industrial microbicidal applications. For example, triphenyltin acetoacetate exhibits fungicidal activity which is somewhat superior to that of triphenyltin acetate, a commercial fungicide, and provides a wider margin of plant safety by virtue of its lower phytotoxicity.

The novel compounds are also useful as catalysts for the production of polyurethane resins by the reaction of an organic polyisocyanate such as toluene diisocyanate with a compound having 2 or more reactive hydrogen atoms.

The following examples serve to illustrate the invention. Unless otherwise indicated, "parts" refers to parts by weight.

EXAMPLE I

A suspension of 13.5 parts of trimethyltin hydroxide and 0.5 part of 1,4-diaazabicyclo[2.2.2]octane in 50 parts of diethyl ether was prepared and 6.3 parts of diketene were added dropwise to the suspension over a pediod of thirty minutes at room temperature and the mixture was then stirred for three hours. The diethyl ether was then evaporated under reduced pressure and 15.4 parts of trimethyltin acetoacetate having a melting point of 60 to 64° C. were recovered. The product was further identified as trimethyltinacetoacetate by infrared analysis and by nuclear magnetic resonance spectroscopy.

EXAMPLE II

Triphenyltin hydroxide (13.8 parts) was suspended in 70 parts of benzene containing 0.5 part of 1,4-diazabicyclo[2.2.2]octane. Diketene (3.5 parts) was added dropwise over a period of 20 to 25 minutes. During this time the reaction temperature rose from 26° to 35° C. The reaction mixture was then stirred until a clear solution was obtained. Insoluble matter was removed by filtration and the benzene was removed on a rotatory evaporator under reduced pressure. The residue product was recrystallized from cyclohexane to give triphenyltin acetoacetate as a white solid (11 parts), M.P. 103–106° C. Concentration of the mother liquor afforded additional product (2.5 parts) of lower purity, M.P. 95–100° C. The combined yield was 80 percent. The structure of the compound was confirmed by infrared and nuclear magnetic resonance spectroscopy.

Calculated for $C_{22}H_{20}O_3Sn$ (450.7): C, 58.7; H, 4.4. Found: C, 59.3; H, 4.2.

EXAMPLE III

Tribenzyltin hydroxide (12.26 parts) and 0.5 part of 1,4-diazabicyclo[2.2.2]octane were suspended in diethyl ether (150 parts). Diketene (3.5 parts) was added in dropwise over a period of 20 to 25 minutes at room temperature. The mixture was then stirred for 4 hours, after which the mixture was filtered and the ether was removed under reduced pressure to give 11.2 parts of tribenzyltin acetoacetate. Recrystallization from diethyl ether gave a white solid, M.P. 52–55° C. The structure of the compound was confirmed by infrared and nuclear magnetic resonance spectroscopy.

Calculated for $C_{25}H_{26}O_3Sn$ (492.7): C, 60.6; H, 5.3. Found: C, 59.4; H, 5.4.

As hereinbefore indicated, the trihydrocarbyltin acetoacetates exhibit excellent fungicidal activity. The following data illustrate the activity of triphenyltin acetoacetate.

A formulation was prepared by dissolving 0.62 gram of the test compound in 25 milliliters of acetone in which had been dissolved 0.062 gram (10 percent by weight of test compound) of an alkylphenoxy polyethoxyethanol surfactant, as an emulsifying or dispersing agent. The resulting solution was mixed with enough water to provide a stock suspension containing 5,000 parts per million of test compound. Serial dilution tests were then carried out by diluting the stock suspension with water to the test compound concentration indicated in Table I. Nutrient agar was prepared by dissolving 8 grams of nutrient broth and 15 grams of agar in 1000 milliliters of distilled water. This medium was divided into 18-milliliter aliquots in 50-milliliter Erlenmeyer flasks which were then autoclaved for 20 minutes, and allowed to cool to between 50° C. and 60° C. Two milliliters of the test solution, obtained by diluting the stock suspension to the indicated concentration, were then added to the flasks. The contens of the flask were agitated and immediately poured into sterile Petri plates. After solidification of the agar, one transfer loop of a fungus colony, prepared by culturing the test organism on nutrient agar for one week at a controlled temperature of 20° C., was gently streaked on the agar surface and the inoculated agar was incubated at 20° C. for two days. After this time, the ability of the test compound to inhibit fungal growth was visually rated on a relative basis of 1 (no control) to 5 (complete inhibition). The results are set forth in Table I below.

TABLE I

| Concentration of triphenyltin acetoacetate in test solution, p.p.m. | Fungi | | | | |
|---|---|---|---|---|---|
| | Asp.[1] | Alt.[2] | Pyth.[3] | Rhiz.[4] | Fus.[5] |
| 100 | 5 | 5 | 5 | 5 | 5 |
| 20 | 5 | 5 | 5 | 3 | 5 |
| 4 | 4 | 5 | 5 | 1 | 4 |
| 0.8 | 1 | 5 | 5 | 1 | 3 |

[1] *Aspergillus niger*
[2] *Alternaria solani*
[3] *Pythium spp.*
[4] *Rhizoctonia solani*
[5] *Fusarium oxysporum f. lycopersici*

To illustrate the activity of the trihydrocarbyltin acetoacetates as heat stabilizers for vinyl resins, tests were carried out using formulations as follows:

| | Parts by weight |
|---|---|
| ¼″ pellets of poly(vinyl chloride) resin having a reduced viscosity of 0.95 | 63.0 |
| Flexol 10-10 plasticizer [1] $[C_6H_4(COOC_{10}H_{21})_2]$ | 35.0 |
| Stabilizer | 1.5 |
| Granulated polyethylene lubricating resin | 0.5 |

[1] Di(mixed decyl)phthalate.

The ingredients were blended until uniform and then milled on a two-roll mill at 170° C. Samples were taken at the times indicated in Table II, below, and the degree of clarity of each sample was determined by measuring the percent of blue light from a standard light source passed through the samples.

TABLE II

| Milling time, minutes | Percent light transmission | |
|---|---|---|
| | Dibutyltin dilaurate | Triphenyltin acetoacetate |
| 1 | 88 | 75 |
| 2 | 86 | 67 |
| 4 | 84 | 70 |
| 6 | 84 | 68 |
| 8 | 85 | 62 |
| 10 | 81 | 55 |
| 15 | 82 | 55 |
| 20 | 71 | 54 |
| 25 | 64 | 54 |
| 30 | 62 | 53 |
| 35 | 53 | 51 |
| 37 | Dark amber | |
| 40 | | 53 |
| 50 | | 57 |
| 60 | | 47 |
| 70 | | 18 |

What is claimed is:
1. A process for the production of trihydrocarbyltin acetoacetates which comprises contacting diketene with a trihydrocarbyltin hydroxide of the formula

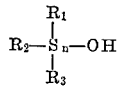

wherein each of the $R_1$, $R_2$, and $R_3$ radicals is a hydrocarbon radical containing from 1 to about 20 carbon atoms.

2. A process as claimed in claim 1 in which the diketene and trihydrocarbylatin hydroxide are contacted in the presence of a catalytically effective concentration of a tertiary amine.

3. A process as claimed in claim 2 in which the tertiary amine is an azabicyclooctane compound.

4. A process as claimed in claim 3 in which the azabicyclooctane compound is selected from the group consisting of 1,4-diazabicyclo[2.2.2]octane, 1-azabicyclo-[2.2.2]octane, and the monoalkyl and dialkyl derivatives thereof wherein each alkyl group contains from 1 to 8 carbon atoms.

5. A process as claimed in claim 2 in which the trihydrocarbyltin hydroxide is the formula

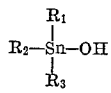

wherein all R groups are identical and each is a hydrocarbon radical containing from 1 to 10 carbon atoms.

6. A process as claimed in claim 5 in which R is selected from the group consisting of methyl, ethyl, phenyl and benzyl.

References Cited

UNITED STATES PATENTS

| 2,922,738 | 1/1960 | McDermott et al. | 260—429.7 X |
| 2,933,475 | 4/1960 | Hoover et al. | 260—429 X |
| 3,320,294 | 5/1967 | Larson | 260—429 |

OTHER REFERENCES

Dub, Organometallic Compounds (1961), vol. II, p. 208.

TOBIAS E. LEVOW, *Primary Examiner.*

W. F. W. BELLAMY, *Assistant Examiner.*

U.S. Cl. X.R.

252—431